March 16, 1965   H. J. FREDE ET AL   3,174,039
SELF-DEVELOPING X-RAY FILM CASSETTE
Filed Dec. 4, 1961   2 Sheets-Sheet 1
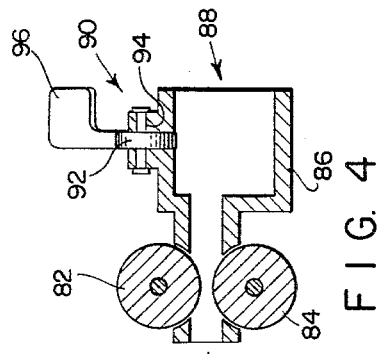
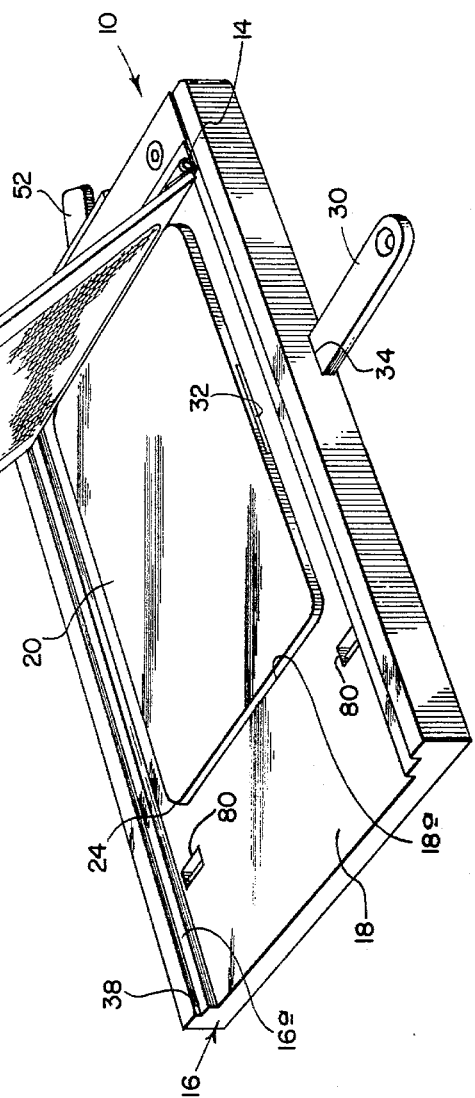
INVENTORS
Herbert J. Frede
BY Robert L. Johnson
Brown and Mikulka
ATTORNEYS

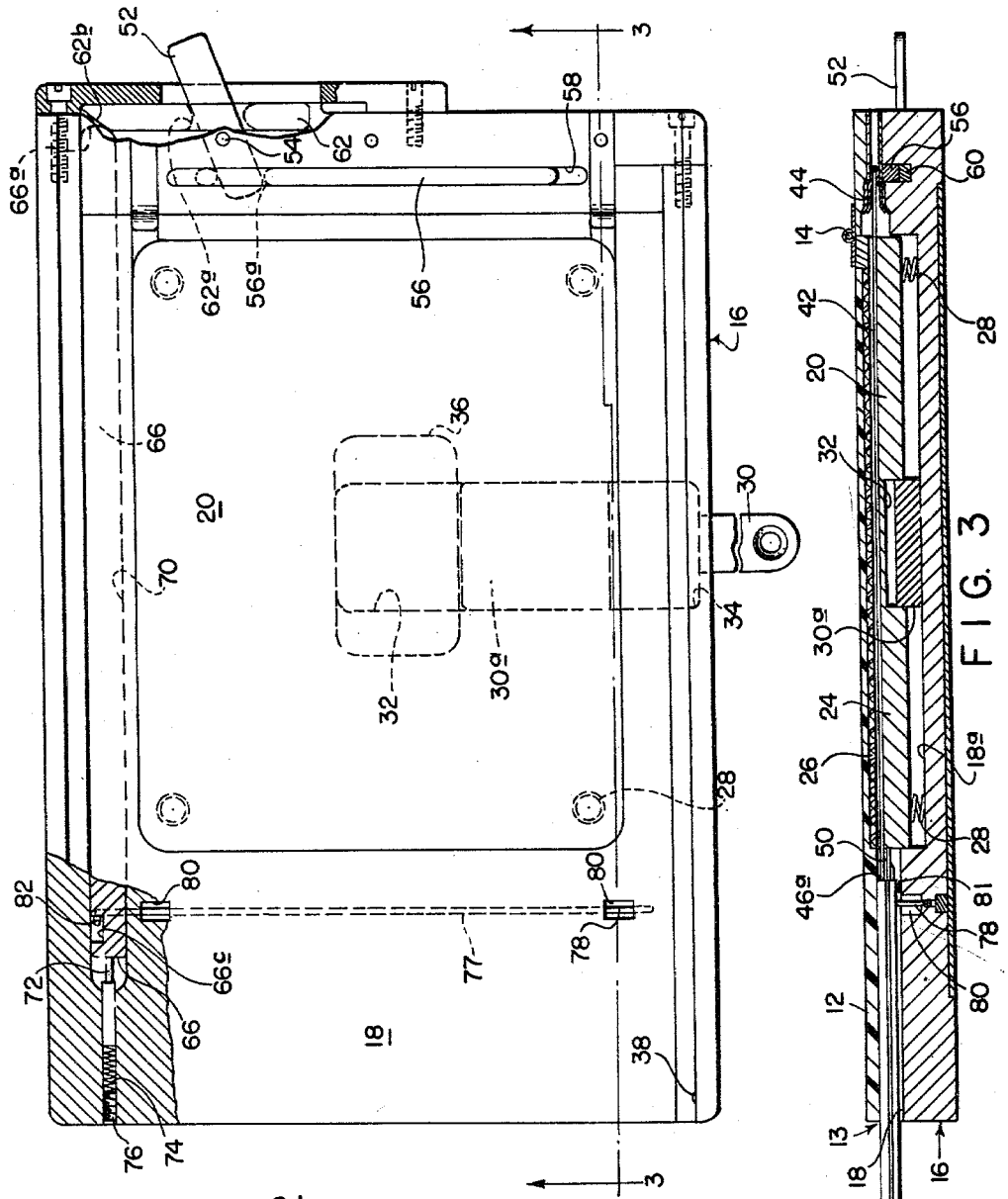

United States Patent Office 3,174,039
Patented Mar. 16, 1965

3,174,039
SELF-DEVELOPING X-RAY FILM CASSETTE
Herbert J. Frede, Framingham, and Robert L. Johnson, Sudbury, Mass., assignors to Polaroid Corporation, Cambridge, Mass., a corporation of Delaware
Filed Dec. 4, 1961, Ser. No. 156,701
14 Claims. (Cl. 250—68)

This invention relates to a novel film holder of a type known as a cassette for X-ray use, especially in conjunction with a film unit containing means for producing a radiograph by a diffusion transfer process.

Objects of the invention are to provide a cassette of the character described which is adapted to use with a film material comprising a photosensitive layer, an image-receiving layer, a releasably confined processing liquid, and an envelope having parts cooperating with mechanical elements of the cassette to enable removal of the envelope from the photosensitive layer for exposure and its return thereto for processing purposes; to provide a cassette which has dimensional advantages of compactness for certain types of X-ray work where very limited areas of the subject are under scrutiny; to provide a cassette, as described, in which the film unit may be loaded and also processed in daylight or in other light actinic with respect to the photosensitive layer; to provide a cassette having a novel intensifying screen and film-holding means; to provide a cassette of the type described having novel film-unit holding and release means for use relative to the exposure and processing steps; and to provide film-unit processing means of a convenient type for use with the cassette.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a perspective view of the X-ray cassette of the invention;

FIG. 2 is a diagrammatic plan view of the cassette, partly in cross-section, with the cover removed and with parts broken away;

FIG. 3 is a diagrammatic side elevation view of the cassette, in cross-section, taken along the line 3—3 of FIG. 2 and includes a fragmentary representation of a film unit mounted therein; and FIG. 4 is a diagrammatic side elevation view, partly in cross-section, of film-unit processing means adapted to combination with the cassette.

A cassette of the relatively small size of that of the present invention is particularly adapted to X-ray procedures wherein the diagnostic area is relatively small as, for example, in so-called deep therapy localization. It also has special advantageous in the industrial field and in veterinary medicine in which small parts or areas may frequently be involved. The cassette permits processing of an exposed film unit in daylight. It also allows the placement of an intensifying screen in intimate contact with a film unit for performing the exposure step and, thereafter, ready removal of the intensifying screen so that the film unit can be processed. Both steps may be accomplished with the utmost ease and speed. When the cassette is used with a film unit of the character described, it becomes possible to perform an X-ray exposure and almost immediately thereafter to obtain a completed radiograph for ready reference as, for example, to provide current information during the course of an operation.

With reference to the drawings, FIG. 1 illustrates the cassette 10 with its cover 12 pivotally attached at hinge 14 to the cassette body 16. The cover is shown at open position, the interior areas thus revealed comprising the platform 18 and the intensifying screen 20 on which a film unit 22 (FIG. 3) is adapted to be mounted for performing the X-ray exposure. The intensifying screen composed, for example, of a conventional fluorescent substance such as barium lead sulphate or other suitable material is bonded to a carrying plate 24, slidably mounted in a recessed area 18a of the platform 18 for movement normal to the latter. The plate 24, together with the screen 20 serving as a bearing surface, constitutes a pressure plate capable of holding the film unit flat and firmly positioned for an X-ray exposure. A pad 26, of felt, velvet or the like, attached to the inner surface of cover 12 contributes to thus hold the film unit when the cover is closed. With the cover 12 closed, a chamber is provided between it and the interior areas 18 and 20.

Pressure plate 24 is shown approximately at its pressure-applying functional position in FIGS. 1 and 2, under bias applied by the four compression springs 28 mounted within circular recesses at its corners and bearing against the lower surface of recessed area 18a. The pressure plate 24 may be retracted in recess 18a to a position at which its upper surface is substantially coplanar with that of platform 18 while a film unit is being mounted in the cassette. This is accomplished by manually inserting the slidably-mounted bar-type latch 30 inwardly to the maximum distance permitted. A guide slot 32 formed in the under surface of pressure plate 24 and a guide slot 34 formed in the cassette body 16 permit in-and-out, linear, slidable movement of the latch 30. The latch is tapered at underneath portions 30a in a direction toward its inner extremity. A plate 36 is mounted athwart the slot 32. While the latch 30 is being fully inserted, its tapered portion 30a bears against the upper surface of the plate 32 in a wedging or camming action. This forces pressure plate 24 downwardly (inwardly) against the bias of springs 28 to its completely recessed position, at which it is held as long as the latch 30 is maintained at its innermost position.

The cover 12, when closed, fits within the flange or groove 16a at its side edges and is held at closed position by a pair of spring-loaded protruding detents 38 which engage the recesses 40, formed in each side of the cover. A more positive holding means may, alternatively, be provided in the form of a latch. When the cover is closed, an elongated space or slot 13 is formed between the cover and platform 18 for insertion and withdrawal of the film unit or of certain of its components, as described below. X-rays from a source of radiation, not shown, are incident on the cassette at the cover side.

Thus, at least the cover may preferably be formed of a plastic material, opaque to visible light but transmissive of X-rays as, for example, of a phenolic material such as Micarta, manufactured by Westinghouse Electric Corporation, U.S.A. or Bakelite, manufactured by the Bakelite Company, U.S.A. The cassette body 16 is formed of a metal, e.g., of aluminum, or instead of a plastic material such, for example, as a plastic material similar to that of the cover.

A film unit 22 is illustrated mounted in the cassette in FIG. 3, with the cassette cover 12 closed and the assembly in readiness for use, it being understood that it is normally placed beneath the subject or part thereof (not shown) to be subjected to X-ray study, which part, accordingly, would be positioned just above the cover 12. The film unit comprises a photosensitive layer 42 with its emulsion facing the intensifying screen and having a resilient metal retaining clip 44 extending transversely across its leading edge; an envelope 46 having an open end at 46a which, as supplied, is releasably held closed between the margins of clip 44, and containing an image-receiving sheet 48 attached to its lower wall; and a container or pod 50, containing a processing liquid.

The condition shown in FIG. 3 is one whereat the unit is in readiness for an exposure, namely, that at which the envelope 46 has been slidably removed from its position covering the photosensitive layer 42 to permit the intensifying screen 20 of the pressure plate 24 to bear directly against the photosensitive layer, as permitted by pulling the latch 30 outwardly to release the pressure plate after the aforesaid partial removal of the envelope.

During the partial removal of envelope 46 to perform the exposure, the photosensitive layer is held against movement therewith by pressure applied to the sides of clip 44. This is accomplished by mechanism as follows. An actuating lever 52 is pivotally mounted at 54. The tip of the lever is inserted in a slot 56a of an elongated, tapered wedge element 56. The wedge element 56 is slidably mounted in a guide channel 58 so as to overlie and ride upon a substantially similar underlying wedge element 60, the tapers of the two elements extending oppositely so that slidable movement of the upper wedge element 56 on the lower wedge element 60 has the effect of increasing or decreasing the overall thickness of the combined aligned elements. When the thickness is thus increased, it causes pressure to be applied to the film unit clip 44 and provides the holding force, above described, for retaining photosensitive layer 42 at exposure position while the envelope 46 is undergoing partial removal.

The lever 52 also passes through a slot 62a formed in a rod-like link member 62 which is slidably mounted for movement transversely of the cassette in a channel 64 and has a shape surface 62b at one extremity which functions as a cam. A second rod-like link 66 is slidably mounted in a channel 70 extending longitudinally of the cassette. One end, 66a, of link 66 serves as a cam follower with respect to the cam extremity 62b of link 62. The other end 66b of link 66 is in contact with a slidably mounted plunger 72. The plunger 72 is biased for movement toward the link 66 by a compression spring 74, the tension of which may be adjusted by a screw 76. A round rod or shaft 77, extending transversely of the cassette, is mounted for rotation in bearing means formed in cassette portion 16. Two outwardly-extending tabs or vanes 78 are fixedly attached to rod 77 and are free to rotate therewith and to assume two functional positions within a pair of slots 80 formed in the platform 18. A slot 66c, formed in link 66, engages a lug 82 extending substantially at 90° from the rod 77. Slidable movement of link 66 is thus adapted to provide rotation of rod 77 and, alternatively, to cause vanes 78 to be rotated to a position at which they extend from slots 80 slightly above the plane of platform 18 or at which they are retracted within the slots. When the vanes 78 protrude upwardly from the slots 80, they are adapted to engage a pair of small, transversely-spaced, raised areas or lugs 81 mounted on the underside of the envelope 46 adjacent to its open end 46a, thus fixing or limiting exactly the distance that the envelope can be withdrawn from its position covering the photosensitive layer 42, prior to its complete removal for processing.

Counterclockwise movement of the lever 52, as seen in FIG. 2, causes the thick portions of the wedges 56 and 60 to be superimposed so that, together, they apply a clamping pressure to the clip 44 of the film unit and thus hold the photosensitive layer 42 against displacement. At the same time, through the media of links 62 and 66, vanes 78 are rotated to positions slightly protruding from slots 80, in readiness to engage the lugs 81 on the underside of envelope 46 and thereby to act as limit stops to prevent complete removal of the envelope. The envelope may thus be withdrawn only to the degree permitted by the engagement of the vanes of the cassette with the lugs of the film unit envelope, namely, to the position shown in FIG. 3.

A device for processing the film unit is shown in FIG. 4. It comprises, basically, a pair of pressure rolls 82 and 84 mounted on a frame or small housing 86. The larger orifice 88 is adapted to accept the open end of the cassette, namely, the left-hand end of the cassette adjacent its aperture as shown in FIGS. 1, 2 and 3, and to hold the latter firmly by means of a toggle type clamp 90 consisting of an eccentrically mounted circular element or roller 92 mounted on shaft 94 and actuated by a handle 96 integral with the roller. With the processing device of FIG. 4 installed on the cassette, a portion of the envelope 46, as seen in FIG. 3, would be positioned between the pressure rolls 82 and 84. After the film unit has been exposed and the envelope returned to its position covering the photosensitive layer, with the wedging clamp 56-60 released and with latch 30 pushed in to withdraw the pressure plate from bearing upon the film, merely an end of the envelope would extend between, and slightly beyond to the left of, the pressure rolls at the smaller orifice 98, this end and the entire film unit contained therein being grasped by the operator and then pulled evenly, between the pressure rolls with a steady even movement. By this action the liquid container 50 is compressed and ruptured, the processing liquid is released and spread between the emulsion and the image-receiving layer, and the radiograph is produced by the diffusion transfer of image-forming components from the emulsion to the image-receiving layer.

The processing device of FIG. 4 is shown in simple form. It is to be understood, however, that a more complete apparatus is comprehended, e.g., one in which one or both of the pressure rolls are spring-loaded; in which the walls of the chamber are pivotally separable; in which a light and dust seal is included at aperture 98; and wherein modified clamping or other attachment means relative to the cassette are provided. Alternatively, the device may be permanently incorporated with the cassette.

In use, the complete cycle of operations is as follows. Let it first be assumed that the cover 12 is closed; that the pressure plate latch 30 has been pushed inwardly to its extreme inward position; and that the lever 52 is at extreme clockwise position. The envelope 46, containing the several elements of the film unit, is manually inserted into the aperture 13 of the cassette to its extreme inner position with the leading edges of the envelope between the edges of the clip 44. The lever 52 is moved to the limit of counterclockwise movement, thus causing wedge elements 56-60 to clamp the clip 44 and causing the vanes 78 to rise above platform 18. The envelope 46 is partially withdrawn, manually, from photosensitive film 42 to the extent permitted by the contact of vanes 78 with lugs 81. The latch 30 is pulled out, the exposure made, and latch 30 again pushed in. The envelope is manually returned to its covering position with its leading edges once again between the clip members. The lever 52 is moved to extreme clockwise position. The entire film unit is manually withdrawn and is passed through the device of FIG. 4 or through a generally similar device for processing purposes. All of the foregoing operations can be performed with extreme rapidity.

Since certain changes may be made in the above apparatus without departing from the scope of the invention herein involved, it is intended that all matter contained in the above description or shown in the accompanying drawings shall be interpreted as illustrated and not in a limiting sense.

What is claimed is:

1. A compact cassette for mounting a film assembly of a self-developing type and positioning a photosensitive element thereof for exposure to X-rays, the film assembly including a slidably removable protective envelope enclosing a photosensitive element, an image-receiving sheet material and a processing liquid carried by a frangible container, said cassette comprising a principal unitary body portion opaque to visible light including a pair of flange members extending along marginal portions thereof, a planar area lying transversely between said flange members for positioning and in part supporting said film assembly during its exposure, a recessed area formed within said planar area for accommodating pressure plate means of said cassette, a planar pressure plate having an intensifying screen bonded to its upper surface movably mounted within said recessed area for inward and outward movement relative thereto and biased for said outward movement by spring means, said intensifying screen thereby being adapted to be brought into direct contact with and to bear forcibly against said photosensitive element when the latter is positioned and firmly held for exposure, a cover element composed of a material capable of transmitting said X-rays but opaque to visible light pivotally attached to said principal body portion adjacent to one end thereof, and means releasably holding said cover element at closed position, said cover element having at least a planar inner surface substantially coextensive with the combined area of said planar area and said pressure plate and adapted, when at closed position, to mate, in light-tight relation, along a pair of edges with said flange members to provide with said planar area and pressure plate an exposure chamber for said film assembly and a surface against which it is held in a flattened state for exposure under bias applied by said pressure plate, said cover, at open position, enabling access to said underlying areas, pressure plate and intensifying screen and at closed position further providing, in conjunction with said planar area, a slot-like opening along an edge opposite to that at which it is pivotally attached for endwise insertion and removal of said film assembly and elements thereof therethrough, prior to and following, respectively, said exposure.

2. A cassette, as defined in claim 1, wherein means for providing said inward movement of said pressure plate comprises a shaft, slidably-mounted in said principal body portion and having a wedge-like camming surface which is adapted to engage and bear forcibly against a cooperating surface of said pressure plate to draw upon and provide retraction of the latter into said recessed area.

3. A cassette, as defined in claim 1, wherein said photosensitive element is positioned and firmly held for exposure, in direct contact with said intensifying screen when said envelope is slidably removed, by gripping means of said cassette in contact with an end area of said photosensitive element.

4. A cassette, as defined in claim 3, wherein the degree to which said envelope can be removed for uncovering said photosensitive element for exposure is determined by limit stop means projecting from said planar area into said chamber and adapted to contact given raised portions of said envelope.

5. A compact cassette for mounting a film assembly of a given self-developing type and positioning a photosensitive element thereof for exposure to X-rays, said cassette comprising a principal unitary body portion opaque to visible light and including a pair of raised flange members extending along marginal parts thereof and interconnected at one end by a raised cross-member, a first recessed planar area lying transversely between said raised flanges and cross-member for positioning and in part supporting said film assembly, a second recessed area formed within said first recessed planar area for accommodating pressure plate means of said cassette, a planar pressure plate having an intensifying screen bonded to its upper surface movably mounted within said second recessed area for inward and outward movement relative thereto and biased for said outward movement by spring means, said intensifying screen of said pressure plate thereby being adapted to be brought into direct contact with and to bear forcibly against said photosensitive element when the latter is positioned for exposure, a cover element composed of a material capable of transmitting said X-rays but opaque to visible light pivotally attached to said raised cross-member, and means releasably holding said cover element at closed position, said cover element having at least a planar inner surface substantially coextensive with the combined area of said first recessed planar area and said pressure plate and adapted, when at closed position, to mate, in light-tight relation, along one edge with said raised cross-member and along a pair of edges with said raised flange members to provide with said first planar area and pressure plate an exposure chamber for said film assembly and a surface against which said photosensitive element is held in a flattened state for exposure under bias applied by said pressure plate, said cover, at open position, enabling access to said underlying areas, pressure plate and intensifying screen and at closed position further providing, in conjunction with said first planar area, a slot-like opening along its fourth edge for endwise insertion and removal of said film assembly and elements in the plane thereof, prior to and following, respectively, said exposure.

6. A cassette, as defined in claim 5, which is adapted to so mount said film assembly therewithin during said exposure that said first recessed planar area and said intensifying screen are located at and bear against one side of said photosensitive element and said cover is located at and bears against the other side thereof.

7. A compact cassette for mounting a film assembly of a given self-developing type and positioning a photosensitive element thereof for exposure to X-rays to provide a finished radiograph, the film assembly including, respectively, an envelope opaque to visible light and having one end adapted to be opened when mounted in the cassette, an image-receiving sheet material fixedly attached to an inner surface of said envelope and adapted to carry the completed radiograph, a photosensitive element comprising a sheet carrying a silver halide emulsion slidably mounted in said envelope for controlled relative movement through said end of the latter, and a rupturable container holding a processing liquid positioned for release of said liquid between said image-receiving material and emulsion, said cassette comprising a principal unitary body portion including a pair of raised flange members extending along marginal parts thereof and interconnected at one end by a raised cross-member, a first recessed planar area lying intermediate of said raised flange members and cross-member for positioning and in part supporting said film assembly, and a second more-deeply-recessed area formed within said first recessed planar area for accommodating pressure plate means of said cassette, a planar pressure plate having an intensifying screen bonded to its upper surface movably mounted within said second recessed area for inward and outward movement relative thereto and biased for said outward movement by spring means, said intensifying screen of said pressure plate thereby being adapted to be brought into direct contact with and to bear forcibly against said emulsion when the latter is positioned for exposure, a cover element composed of a material capable of transmitting said X-rays but opaque to visible light pivotally attached to said raised cross-member, and means releasably holding said cover element at closed position, said cover element having at least a planar inner surface substantially coextensive with the combined area of said first recessed planar area and said pressure plate and adapted, when at closed position, to mate, in light-tight relation, along one edge with said raised cross-member and along a pair of edges with said raised flange members to provide, with said first planar area and pressure plate, an exposure chamber for said film assembly and a surface against which said photosensitive element is held in a flattened state for exposure under bias applied by said pressure plate, said cover, at open position, enabling access to said underlying areas, pressure plate and intensifying screen and at closed position further providing, in conjunction with said first planar area, a slot-like aperture along its fourth edge for generally-linear, endwise insertion and removal of said film assembly and elements in the plane thereof, prior to and following, respectively, said exposure, said slot-like open aperture having a width substantially equal to the thickness of said film assembly whereby visible light is excluded from entering said opening.

8. A cassette, as defined in claim 7, wherein manually-operable withdrawing means, in part mounted on said principal body portion and extending into said second recessed area and in part mounted on the under surface of said pressure plate, enable said inward movement of said pressure plate in a direction away from said cover element and into said second recessed area.

9. A cassette, as defined in claim 8, wherein said manually-operable means for providing said inward movement of said pressure plate comprises, respectively, a tapered cam-like shaft slidably mounted for inward and outward movement in a side wall of said principal body portion, and a recess with a tapered overlying piece formed in the under surface of said pressure plate whereby, when said shaft is thrust inwardly, its tapered extremity is adapted to enter said recess and bear against an inner surface of said overlying piece to force said pressure plate, against the bias of said spring means, into said second recess.

10. A compact cassette for mounting a film assembly of a given self-developing type and positioning a photosensitive element thereof for exposure to X-rays to provide a finished radiograph, the film assembly including, respectively, an envelope opaque to visible light and having one end adapted to be opened when mounted in the cassette, an image-receiving sheet material fixedly attached to an inner surface of said envelope and adapted to carry the completed radiograph, a photosensitive element comprising a sheet carrying a silver halide emulsion slidably mounted in said envelope for controlled relative movement through said end of the latter, and a rupturable container holding a processing liquid positioned for release of said liquid between said image-receiving material and emulsion, said cassette comprising a principal unitary body portion including a pair of raised flange members extending along longitudinal marginal parts thereof and interconnected at one end by a raised transverse member, a first recessed planar area lying intermediate of said raised flange members and cross-member for positioning and in part supporting said film assembly, a second more-deeply-recessed area formed within said first recessed planar area for accommodating pressure plate means of said cassette, a planar pressure plate having an intensifying screen bonded to its upper surface movably mounted within said second recessed area for inward and outward movement relative thereto and biased for said outward movement by spring means, said intensifying screen of said pressure plate thereby being adapted to be brought into direct contact with and to bear forcibly against said emulsion when the latter is positioned for exposure, a cover element composed of a material capable of transmitting said X-rays but opaque to visible light pivotally attached to said raised transverse member, and means releasably holding said cover element at closed position, said cover element having at least a planar inner surface substantially coextensive with the combined area of said first recessed planar area and said pressure plate and adapted, when at closed position, to mate, in light-tight relation, along one edge with said raised transverse member and along a pair of edges with said raised flange members to provide with said first planar area and pressure plate an exposure chamber for said film assembly and a surface against which said photosensitive element is held in a flattened state for exposure under bias applied by said pressure plate, said cover, at open position, enabling access to said underlying areas, pressure plate and intensifying screen and at closed position further providing, in conjunction with said first planar area, a slot-like opening along its fourth edge for insertion and removal of said film assembly and elements thereof, prir to and following, respectively, said exposure, said raised transverse member containing therewithin clamping means for engaging an end of said photosensitive element manually operable by exteriorly projecting actuating means for holding said photosensitive element fixed within the cassette while said envelope is withdrawn endwise a predetermined distance through said slot-like opening to place said emulsion in direct contact with said intensifying screen during said exposure.

11. A cassette, as defined in claim 10, wherein withdrawal of said envelope, said predetermined distance is obtained by limit stop means interconnected with said clamping means and positionable by said actuating means.

12. In combination with a self-developing film assembly including an open-ended envelope opaque to visible light and enclosing, respectively, a photosensitive element having a retaining clip at one end, a rupturable container releasably-containing a processing liquid, and a film material for carrying a completed radiograph, a cassette for mounting said film assembly and positioning said photosensitive element thereof for exposure, said cassette comprising a principal unitary body portion including a pair of raised flange members extending along marginal parts thereof, a first recessed planar area lying intermediate of said raised flange members for positioning and in part supporting said film assembly, a second recessed area formed within said first recessed planar area for accommodating pressure plate means of said cassette, a planar pressure plate having an intensifying screen bonded to its outer surface movably mounted partially within said second recessed area for inward and outward movement relative thereto and biased for said outward movement by spring means located within said second recessed area, said intensifying screen of said pressure plate thereby being adapted to be brought into direct contact with and to bear forcibly against said photosensitive element when the latter is positioned for exposure, a cover element composed of a material transmissive of said X-rays but opaque to visible light, said cover element being movably attached to said body portions and adapted, at closed position, to provide a light-tight contact with said flange members and to form, with said first recessed area, a slot at one end of the cassette for loading and removal of said film assembly therethrough, latch means releasably holding said cover element at closed position, clamping means mounted in said body portion for compressively engaging a portion of said retaining clip to hold said photosensitive element fixed therebetween while releasing the open end of said envelope therefrom during manual withdrawal of the latter, limit stop means for engaging cooperating means of said envelope and limiting the extent of said withdrawal, and manually operable actuating means for actuating said clamping and limit stop means.

13. A cassette, as defined in claim 12, wherein said clamping means is a pair of elongated oppositely-tapered wedges slidably-mounted to vary their effective thickness, and said limit stop means is a pair of pivotally mounted vanes adapted to project forwardly from said first recessed planar area, said means being interlocking and manually operable cooperatively by actuating means extending from said unitary body portion.

14. A cassette, as defined in claim 12, wherein is included, mounted on said principal body portion and adjacent to said slot, compression-applying means between said film assembly is adapted to be drawn manually to rupture said container and release and spread said processing liquid between said photosensitive element and radiograph-carrying film material.

References Cited in the file of this patent
UNITED STATES PATENTS

| | | |
|---|---|---|
| 1,357,391 | Freytag | Nov. 2, 1920 |
| 1,769,370 | Fabe et al. | July 1, 1930 |
| 2,026,000 | Powers | Dec. 31, 1935 |
| 2,659,825 | Land | Nov. 17, 1953 |
| 2,689,306 | Land | Sept. 14, 1954 |
| 2,709,223 | Bachelder et al. | May 24, 1955 |